United States Patent [19]

Speit

[11] Patent Number: 4,906,597

[45] Date of Patent: Mar. 6, 1990

[54] SOLARIZATION-STABLE ULTRAVIOLET FILTER GLASSES FOR THE 280 - 500 NM TRANSMISSION RANGE

[75] Inventor: Burkhard Speit, Mainz, Fed. Rep. of Germany

[73] Assignee: Schott Glaswerke, Mainz, Fed. Rep. of Germany

[21] Appl. No.: 179,063

[22] Filed: Apr. 8, 1988

Related U.S. Application Data

[62] Division of Ser. No. 136,191, Dec. 21, 1987, Pat. No. 4,820,326.

[30] Foreign Application Priority Data

Dec. 19, 1986 [DE] Fed. Rep. of Germany ..... 36434213

[51] Int. Cl.$^4$ .................. C03C 3/02; C03C 3/105; C03C 3/108
[52] U.S. Cl. .......................... 501/60; 501/61; 501/62
[58] Field of Search ............ 501/905, 60, 61, 62

[56] References Cited

U.S. PATENT DOCUMENTS 2,693,422 11/1954 Duncan et al. ............... 501/905
4,520,115 5/1985 Speit et al. .................... 501/60

FOREIGN PATENT DOCUMENTS 399469 11/1974 U.S.S.R. .................... 501/71

Primary Examiner—Mark L. Bell
Attorney, Agent, or Firm—Edwin D. Schindler

[57] ABSTRACT

Alkali silicate glasses, pigmented with $Co^{2+}$ or with $Co^{2+}$ and $Ni^{2+}$, and having the composition:

| | |
|---|---|
| $SiO_2$ | 52–71% by weight |
| PbO | 2.9–16.8% by weight |
| $SnO_2$ | 0.1–1.65% by weight |
| $Na_2O$ | 6.7–16.7% by weight |
| $K_2O$ | 0.5–9.9% by weight |
| $Na_2O + K_2O$ | 13.3–18.3% by weight |
| NiO + CoO | 0.1–4.4% by weight |
| $As_2O_3 + Sb_2O_3$ | 0.05–0.5% by weight |
| ΣRO | 0–8.6% by weight |
| $B_2O_3$ | 0–8.5% by weight |
| $Al_2O_3$ | 0–0.55% by weight |
| ZnO | 0–10.5% by weight, | in which R is Mg, Ca, Sr, Ba or a combination thereof, are disclosed. The alkali silicate glasses of the invention are useful as optical filter glasses.

1 Claim, 8 Drawing Sheets

Emission Lines of the Sylvania Germicidal Emitter, G15 T8

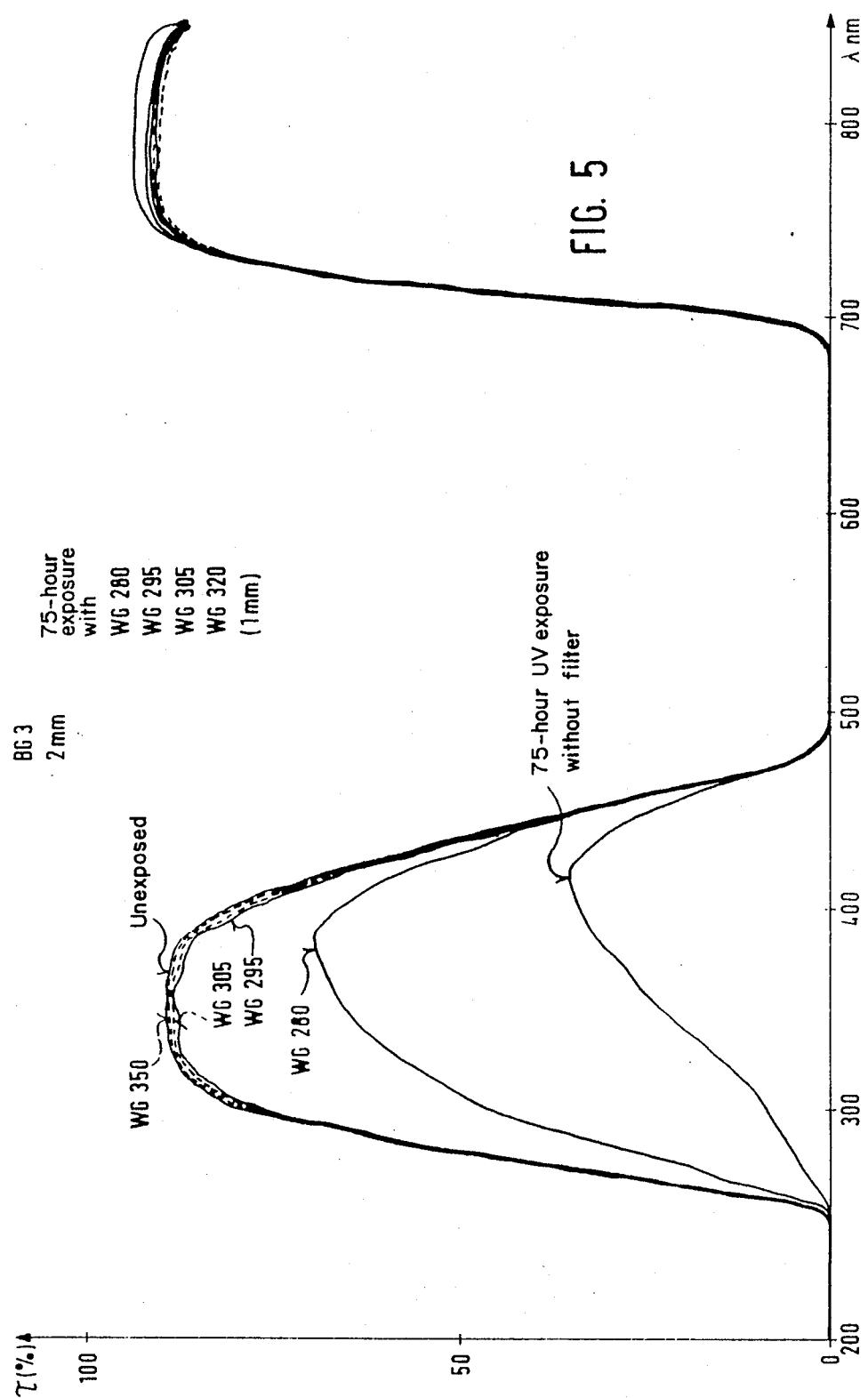

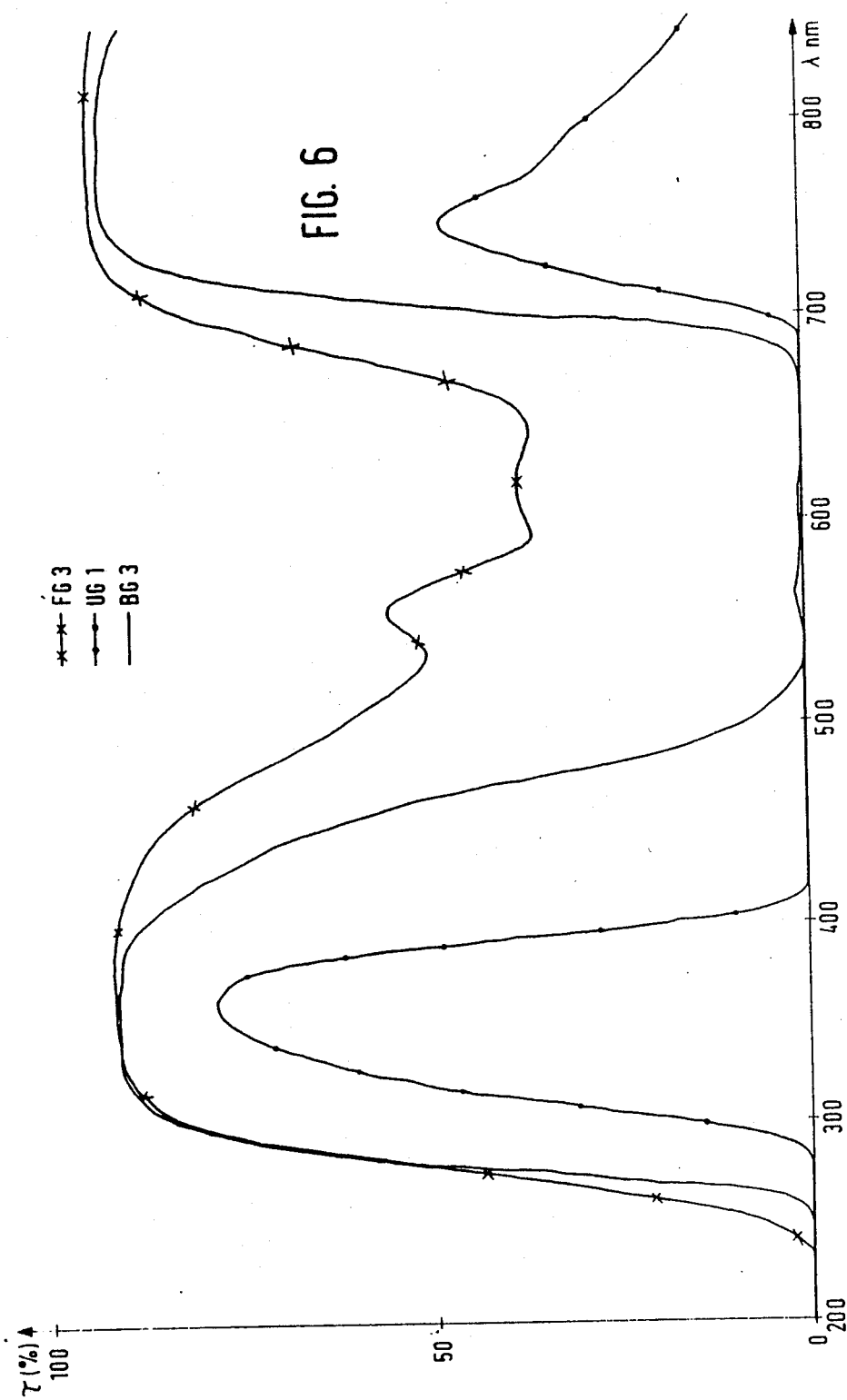

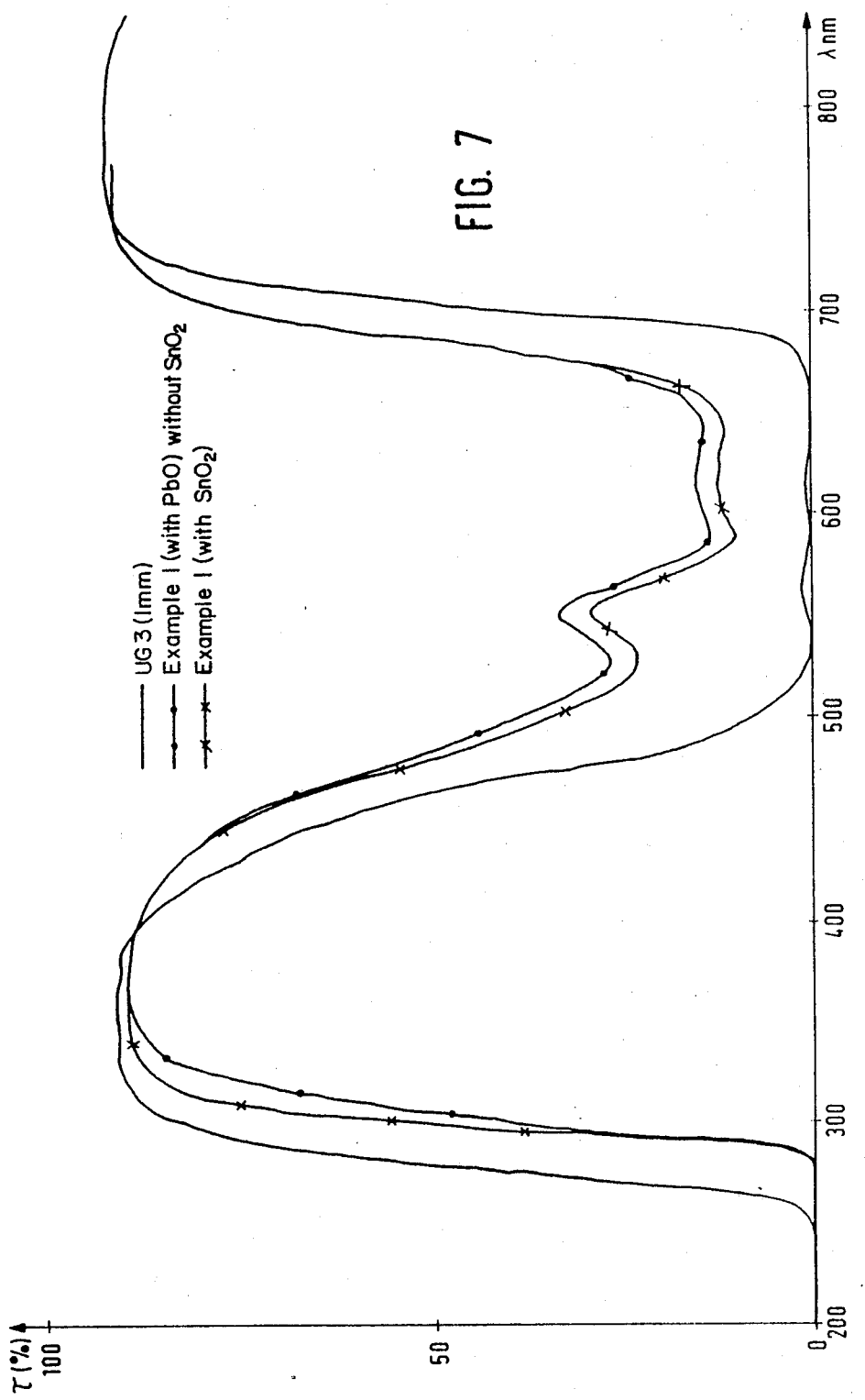

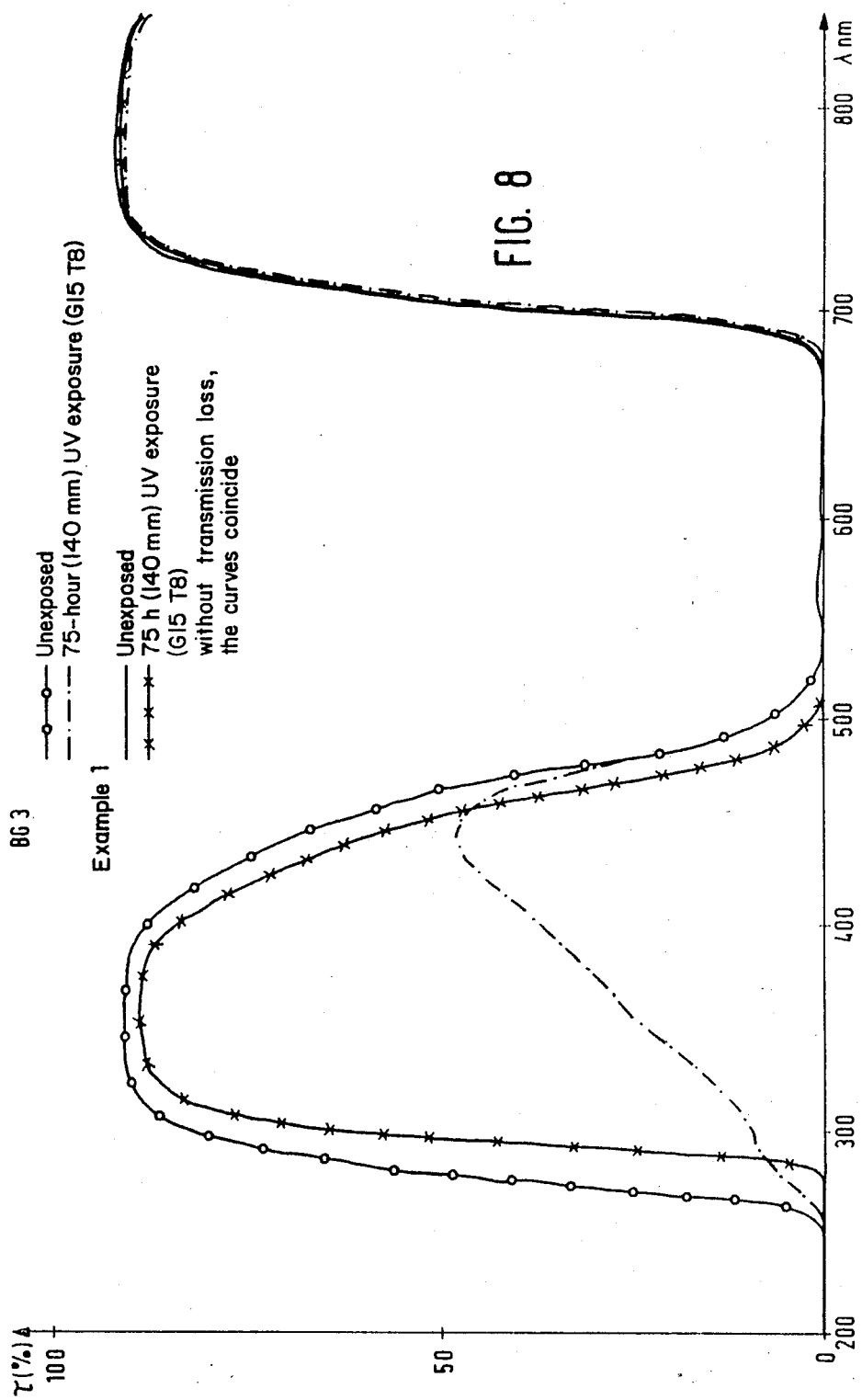

SOLARIZATION-STABLE ULTRAVIOLET FILTER GLASSES FOR THE 280 - 500 NM TRANSMISSION RANGE

This application is a division of application Ser. No. 136,191, filed Dec. 21, 1987, now U.S. Pat. No. 4,820,326.

BACKGROUND OF THE INVENTION

Technical Field of the Invention

The present invention relates, generally, to alkali silicate glasses which are used as the basic glasses for the manufacture of selective filter glasses. More particularly, the present invention relates to the manufacture of selective filter glasses, colored with $Co^{2+}$ or with $Co^{2+}$ and $Ni^{2+}$, which have transmission ranges primarily in the ultraviolet and visible spectral region between 280 and 500 nanometers (nm). These ion-colored glasses are imbued with the characteristic absorption bands of $Co^{2+}$ and $Co^{2+}$ together with $Ni^{2+}$ and, therefore, depending upon the layer thickness, produce selective bell-shaped transmission ranges, each surrounded by two stop ranges.

BRIEF DESCRIPTION OF DRAWINGS

FIG. 5 shows the absorption relationship of filtered high-energy UV components.

FIG. 6 shows glasses capable of being used for the present invention in terms of the width of their transmission bands.

FIG. 7 shows the steepness of the absorption edge of glass containing $SnO_2$.

FIG. 8 shows a comparison of the transmission curves of a conventional glass (BG 3) with the glass of Example 1.

Figure 1:
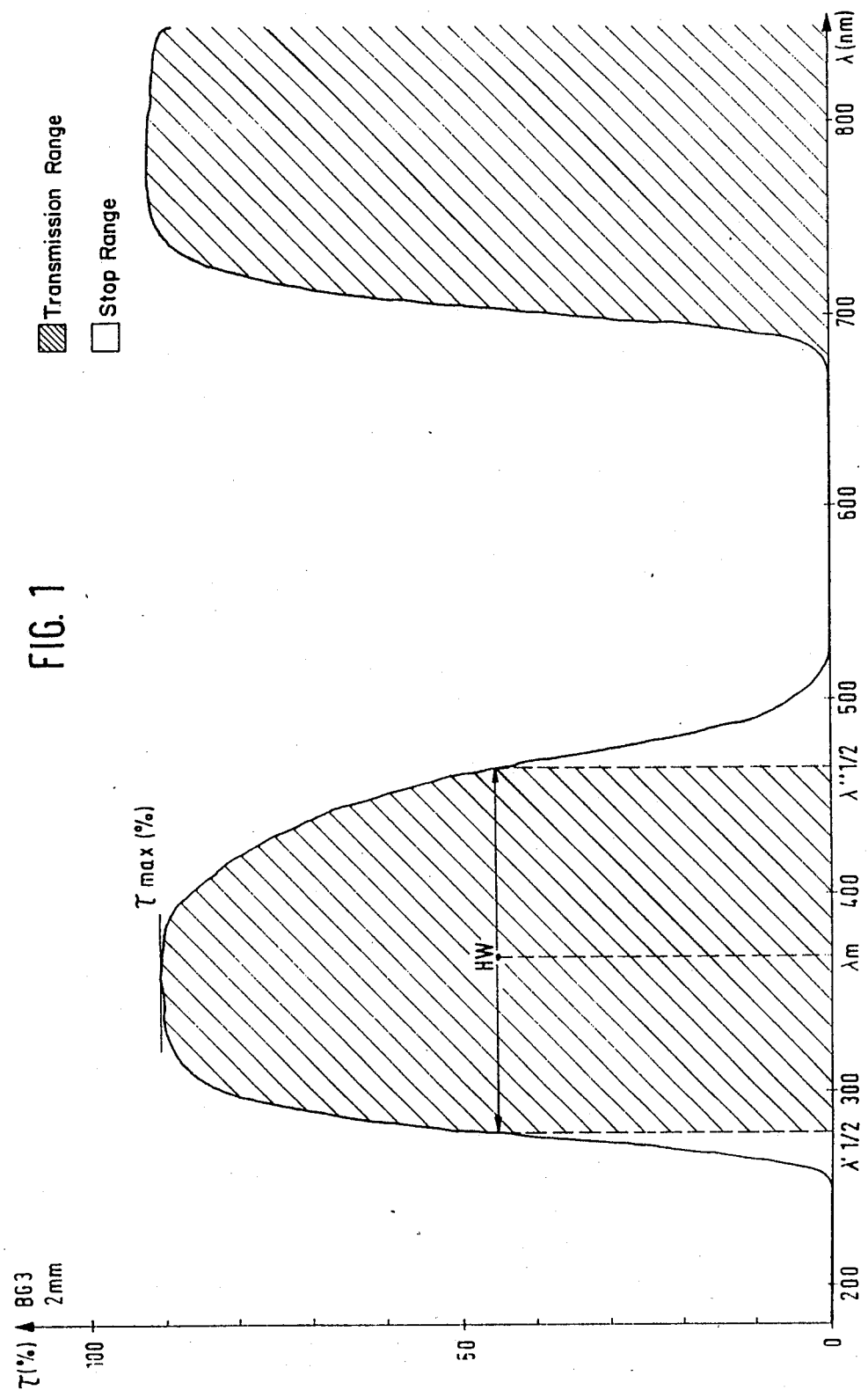
FIG. 1 shows the most important characteristics of these so-called band pass filters.

The most important characteristics of these so-called band pass filters, when the layer thickness is known, are the maximum of spectral transmission in the transmission band, $T_{max}$ and the half-value wavelengths $\lambda'_{\frac{1}{2}}$ and $\lambda''_{\frac{1}{2}}$ with a spectral transmission of $T_{max}/2$. The midpoint between the half-value wavelengths $\lambda'_{\frac{1}{2}}$ and $\lambda''_{\frac{1}{2}}$ is called the mean wavelength $\lambda_m$; the distance from $\lambda'_{\frac{1}{2}}$ to $\lambda''_{\frac{1}{2}}$ is known as the half-value width (HW). (See FIG. 1.)

In research, engineering and medicine, these glasses are used, for example, as conversion filters in a narrow spectral region and, more particularly, are used in the filtering of UV light sources in the emission range from 200 to 1100 nm, with particular significance as pass filters in the ultraviolet spectral region from 250 to 400 nm and as stop filters in the spectral region of approximately 420 to 680 nm. The glasses can readily have compositions that assure high chemical resistance to acids, alkalis and water.

Description of the Prior Art

Alkali silicate glasses colored with $Co^{2+}$ or with $Co^{2+}$ and $Ni^{2+}$ are available from the major manufacturers of optical filter glass and, therefore, known to the art, e.g. U.S. Pat. No. 3,902,881. Examples include BG 3, FG 3, UG 1 (Schott catalogue), 1-61, 7-51 (Corning catalogue), BD 37-93 (VEB Jena catalogue) and others. A drawback experienced with these glasses is that if they are exposed to ultraviolet radiation for a relatively long duration, the spectral transmission of these glasses can change, predominantly in the ultraviolet spectral range. The absorption increases up to a certain saturation value. This undesirable phenomenon is called solarization. The aforementioned saturation value is attained at varying degrees of quickness, depending upon the duration and intensity of the irradiation and on the distance of the filter glass from the light source. The glass "ages" and then is only conditionally usable for its intended purpose.

Figure 2:
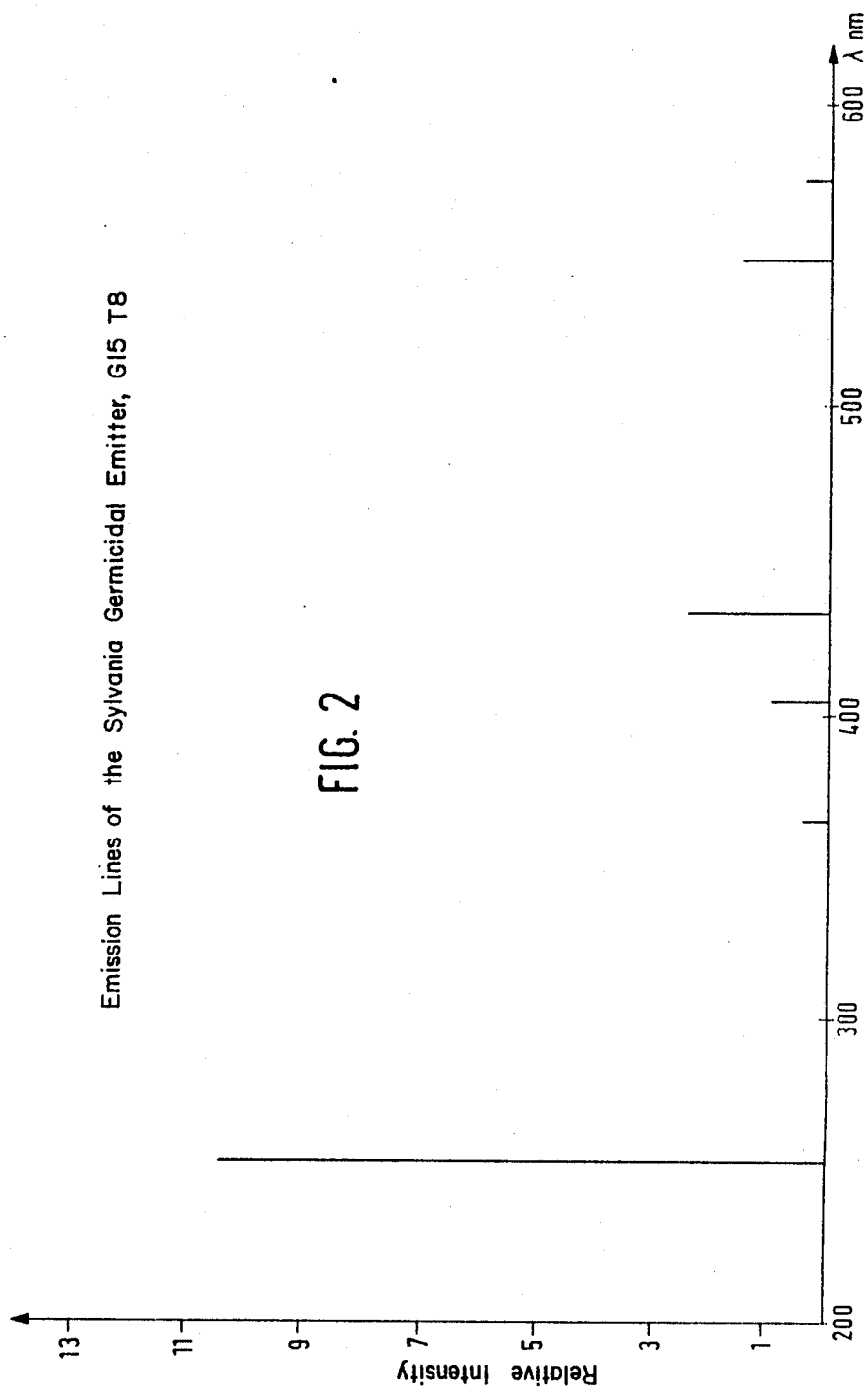
FIG. 2 shows emission lines of the Sylvania Germicidal Emitter, G15 T8.

For ascertaining the solarization properties of filter glasses, the following testing procedure is typical and generally applicable:

| | |
|---|---|
| thickness of sample: | 1 mm |
| light source: | low-pressure mercury lamp (maximum emission at 254 nm), type: "Sylvania Germicidal," G 15 T 8, sold by Philips (emission spectrum, see FIG. 2) |
| filtering of source: | none |
| exposure time: | 75 hours |
| sample-to-source distance: | 140 mm |
| measured variable: | $\Delta\tau$(transmission before and after UV exposure) |

Figure 3:
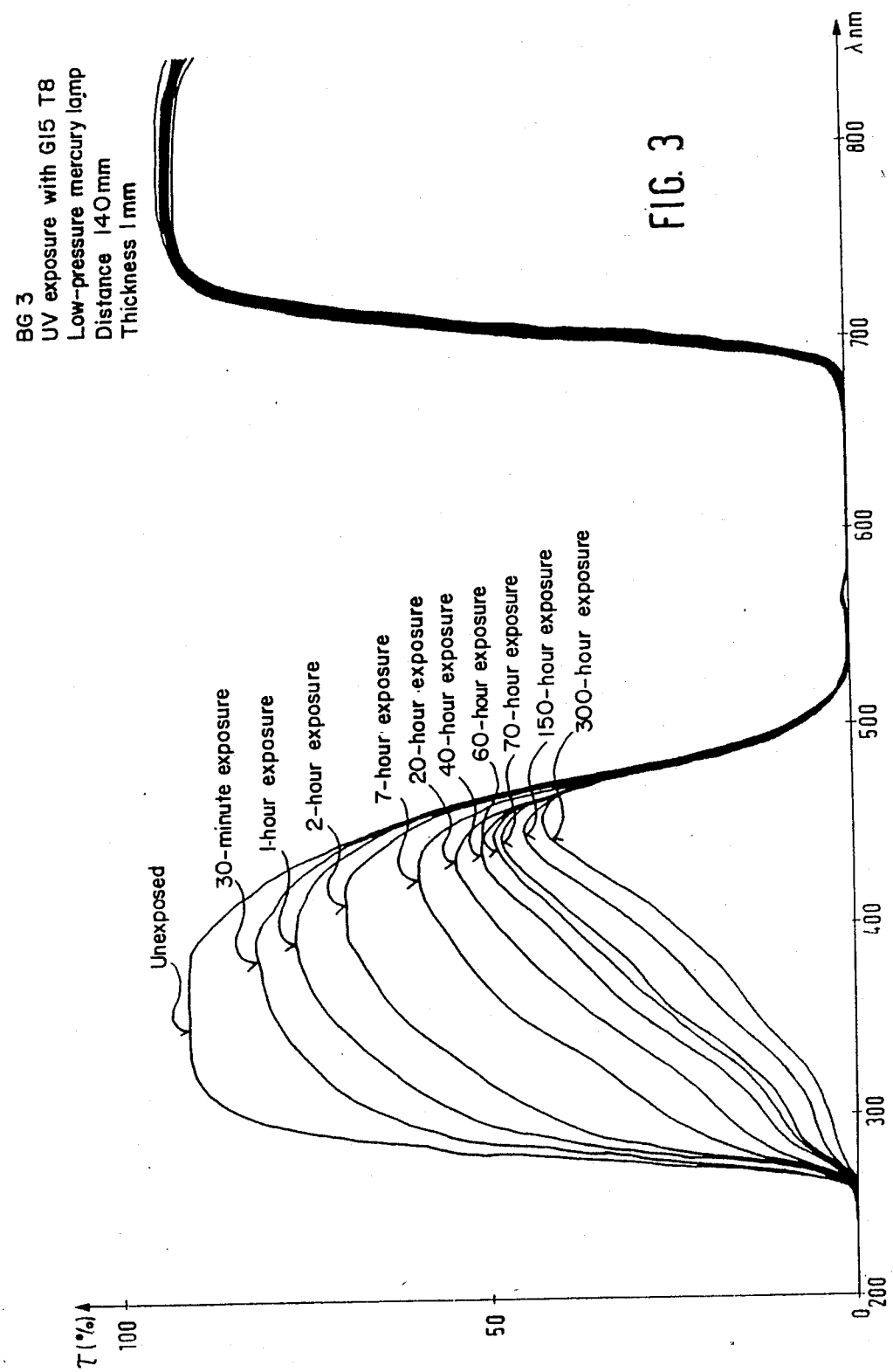
In FIGS. 3 and 4, transmission curves are plotted, from 200 to 850 nm for both before and after solarization testing. The curves demonstrate the very severe change in filter properties in the transmission band from 260 to 520 nm.
Figure 4:
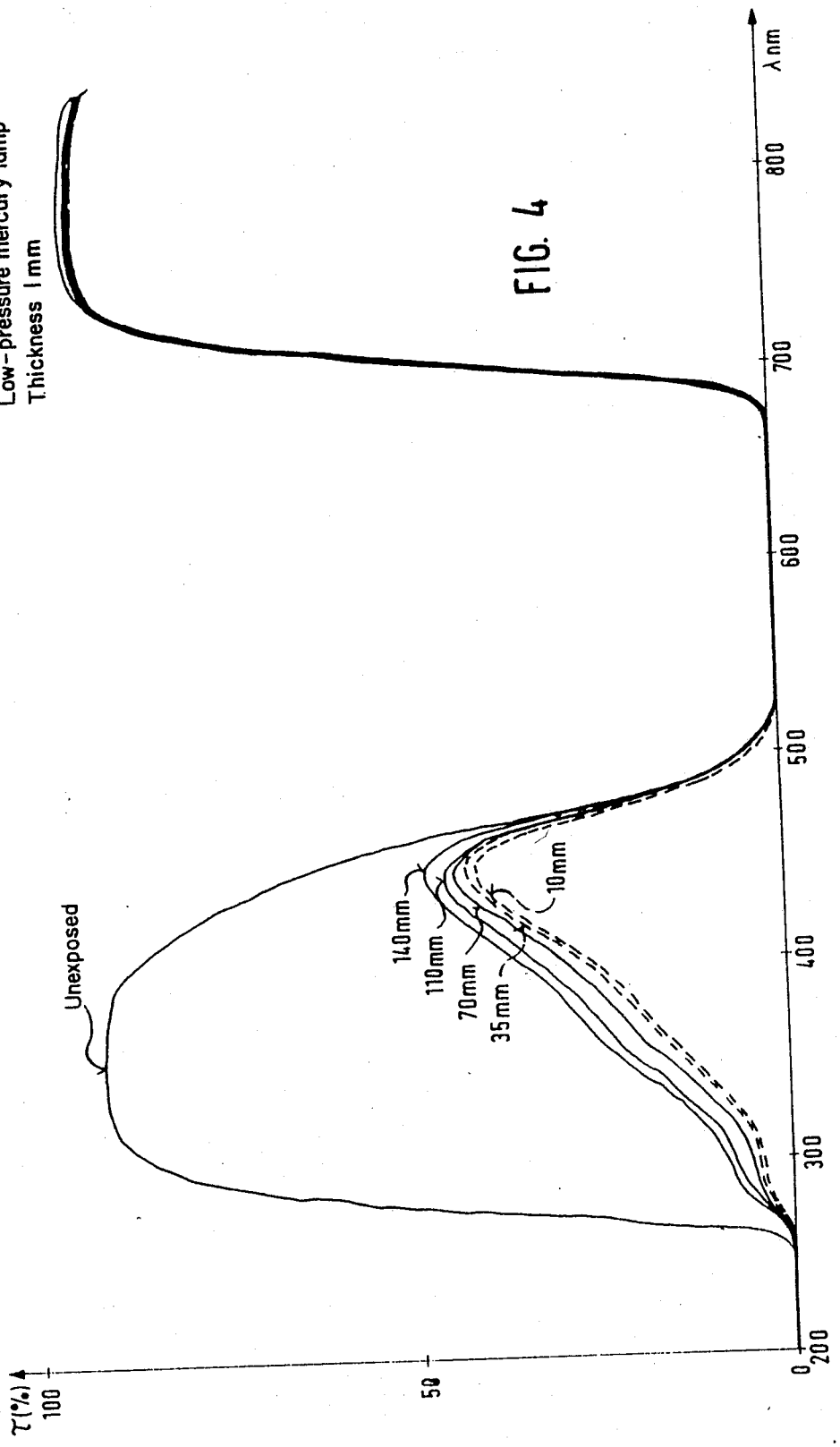

In FIGS. 3 and 4, transmission curves are plotted, from 200 to 850 nm for both before and after the above-described solarization testing procedure, taking a commercially available blue alkali silicate glass as an example (BG 3 made by Schott Glaswerke, Mainz, Federal Republic of Germany). The curves demonstrate the very severe change in filter properties in the transmission band from 260 to 520 nm.

DESCRIPTION OF THE INVENTION

An object of the present invention is to provide UV filters, made of alkali silicate glasses, having high a chemical stability to acids, alkalis and water and having a high solarization resistance when exposed to ultraviolet light for relatively long periods of time.

The foregoing and related objects are accomplished by the use of an alkali silicate glass, colored with $Co^{2+}$ or with $Co^{2+}$ and $Ni^{2+}$, as an optical filter glass, which has the following composition:

| | |
|---|---|
| $SiO_2$ | 52–71% by weight |
| PbO | 2.9–16.8% by weight |
| $SnO_2$ | 0.1–1.65% by weight |
| $Na_2O$ | 6.7–16.7% by weight |
| $K_2O$ | 0.5–9.9% by weight |
| $Na_2O + K_2O$ | 13.3–18.3% by weight |
| NiO + CoO | 0.1–4.4% by weight |
| $As_2O_3 + Sb_2O_3$ | 0.05–0.5% by weight |
| $\Sigma MgO + CaO + SrO + BaO$ | 0–8.6% by weight |
| $B_2O_3$ | 0–8.5% by weight |
| $Al_2O_3$ | 0–0.55% by weight |
| ZnO | 0–10.5% by weight |

It has surprisingly been discovered that in the present invention, the UV components that bring about the solarization are already absorbed in the surface layers of the filters and no further solarization can be brought about in the filter itself. A comparable effect can be attained by filtering the UV light source with 1-mm-edge filters for 280, 295, 305 and 320 nm. By this means, the highest-energy UV components are absorbed and are, accordingly, no longer available as excitation energy for forming pigment centers, which are also the cause for solarization in the glasses. This relationship is described in FIG. 5. By doping the glasses with PbO, $SnO_2$ and/or $CeO_2$, $TiO_2$, $Fe_2O_3$ and $V_2O_5$, the absorption edge of the basic alkali silicate glasses can be shifted up to 60 nm toward the longer-wave spectral region.

Glasses capable of being used for the present invention, which have a layer thickness of 1 mm, can be divided among the following groups in terms of the width of their transmission bands (see, FIG. 6):

TABLE 1

|  | $\tau_{max}$ (%) exposure before | $\tau_{max}$ (%) exposure after | $\lambda'_{\frac{1}{2}}$ (nm)* | $\lambda''_{\frac{1}{2}}$ (nm) | $\lambda_m$ (nm) | HW (nm) | Colorant |
|---|---|---|---|---|---|---|---|
| I. | 88 | 87 | 290 | 460 | 375 | 170 | $Co^{2+}$ |
| II. | 89 | 87 | 300 | 490 | 395 | 190 | $Co^{2+}$ |
| III. | 82 | 81 | 310 | 390 | 350 | 80 | $Co^{2+}$ + $Ni^{2+}$ |

+ Exposure conditions as in aforesaid test procedure.
*values ± 5 nm

In contrast to the filters of the present invention, Table 2 presents comparative test results with equivalent commercially available band pass filters and conversion filters:

TABLE 2

|  | $\tau_{max}$ (%) exposure before | $\tau_{max}$ (%) exposure after+ | $\lambda'_{\frac{1}{2}}$ (nm)* | $\lambda''_{\frac{1}{2}}$ (nm) | $\lambda_m$ (nm) | HW (nm) | Colorant |
|---|---|---|---|---|---|---|---|
| BG3[1] | 88 | 13 | 275 | 450 | 362 | 175 | $Co^{2+}$ |
| FG3[2] | 89 | 42 | 270 | 550 | 410 | 280 | $Co^{2+}$ |
| UG1[3] | 78 | 71 | 310 | 390 | 350 | 80 | $Co^{2+}$ + $Ni^{2+}$ |

(+)Exposure conditions as in aforesaid test procedure.
*values ± 5 nm
[1]BG = blue, blue-green and band filters; band pass filters
[2]FG = blue and brown color fixtures; conversion filters
[3]UG = black and blue grass band pass filters The shift of the UV absorption edge in groups I and II toward longer wavelengths is apparent. To some extent, this narrows the transmission band in the farther UV band (260 to 310 nm).

According to the invention, because of the PbO and $SnO_2$ content in the various quantity ranges claimed for synthesizing the alkali silicate glasses, not only is a shift of the absorption edge to the longer-wave spectral region achieved, but also a marked reduction is brought about in the tendency toward solarization of the glasses.

The steepness of the absorption edge is favorably affected, depending on the type of glass, by $SnO_2$ in the range of from 0.1 to 1.7% by weight, i.e., by means of $SnO_2$, a greater steepness of the absorption edge is attained (see, FIG. 7). As a result, the midpoint of the transmission band of the filters, which is measurable by the variable $\lambda_m$(nm), is changed only negligibly as compared with the conventional filters having a greater tendency toward solarization (compare, Table 1 and 2).

The modification of the alkali silicate synthesis by PbO and $SnO_2$ necessitates particular provisions in the production of bubble-free, homogeneous optical filter glasses. To this end, according to the present invention, in addition to the classical refining agents $As_2O_3$ and/or $Sb_2O_3$, depending on the basic glass synthesis, F, Cl, $NH_4Cl$ and $SO_3$ are used, above all, for reinforcing the refining action. In addition to from 0–0.5% by weight of $F^-$, the glasses used may also contain from 0–3% by weight of $Li_2O$ to lower the temperature for the viscosity range between $10^2$ and $10^6$ dPa.s.

The shift of the absorption edge is not only attainable by means of PbO and $SnO_2$, but also by means of the ions having absorption bands between 250 and 400 nm, especially by means of the ions $Ce^{4+}$, $Ti^{4+}$, $Fe^{3+}$, $V^{5+}$, and $Pd^{2+}$. Together with the refining agents, $As_2O_3$ and/or $Sb_2O_3$, and the Coloring "filter ions," $Co^{2+}$ and $Ni^{2+}$, the concentration of these ions should be no more than at a minimal level. This is because the interaction of two ambivalent ions in irradiation with ultraviolet light leads to quite pronounced solarization effects in alkali silicate glasses. This relationship is known and has been described in various publications, including:

Hideo Hosono et. al., *J. of NCS* 63 (1984), pages 357–63; and

Klaus Bermuth et. al., *Glastechn. Ber.* [Reports in Glass Technology] 58 (1985) 3, pages 52–58.

From Tables 1 and 2, it becomes clear from the example of group III of the glasses having the composition according to the invention, that the location of the absorption edge at 310 nm is not affected by the PbO and $SnO_2$ ingredients, but, instead, that a considerable reduction in solarization occurs as compared with glasses in which PbO and and $SnO_2$ are absent. It is conceivable that by the incorporation of $Pb^{2+}$ and $Sn^{2+}$ or $Sn^{4+}$, a structural change in the silicate glasses takes place, such that the formation of pigment centers, due to UV irradiation, is rendered more difficult, or is even suppressed entirely.

The transmission of the basic glasses is characterized by the specific absorption of at least one of the following components:

1–1.5% by weight of CoO (optionally in the form of CoO and $Co_2O_3$); and

0–4.4% by weight of NiO (optionally in the form of NiO and $Ni_2O_3$).

In Table 3, which follows below, some examples from the useful composition range are provided:

TABLE 3

| | Examples of Compositions (% by weight) | | | | | |
|---|---|---|---|---|---|---|
| | Group I | | Group II | | Group III | |
| | 1 | 2 | 3 | 4 | 5 | 6 |
| $SiO_2$ | 64.00 | 57.30 | 65.20 | 70.50 | 54.60 | 52.15 |
| $B_2O_3$ | 8.65 | 8.45 | 17.30 | — | 4.00 | 5.00 |
| $Al_2O_3$ | — | — | 3.00 | — | 0.30 | 0.55 |
| $Li_2O$ | — | — | — | 3.00 | — | — |
| $Na_2O$ | 8.60 | 6.70 | 8.10 | 16.70 | 8.40 | 11.40 |
| $K_2O$ | 8.30 | 6.60 | 1.50 | 0.50 | 9.90 | 5.65 |
| MgO | — | 1.60 | — | — | — | 1.30 |
| CaO | — | 1.50 | — | 1.85 | — | 4.80 |
| SrO | — | 1.55 | — | 1.90 | — | — |
| BaO | 1.90 | — | — | 0.45 | — | 2.50 |
| ZnO | 1.10 | 10.50 | — | — | 1.80 | 5.70 |
| PbO | 4.95 | 4.00 | 3.40 | 2.90 | 16.75 | 2.90 |
| $TiO_2$ | — | — | — | 0.80 | — | — |
| $SnO_2$ | 1.20 | 1.25 | 0.60 | 0.30 | 0.10 | 1.65 |
| $As_2O_3$ | 0.25 | 0.10 | 0.50 | 0.10 | 0.05 | 0.05 |
| $Sb_2O_3$ | — | 0.10 | — | — | 0.25 | — |
| $NH_4Cl$ | 0.15 | — | — | 0.30 | — | — |
| Cl | — | — | 0.05 | — | — | — |
| F | — | — | 0.10 | 0.50 | 0.10 | — |
| $SO_3$ | 0.10 | — | 0.10 | — | 0.20 | 0.10 |
| $CeO_2$ | — | — | — | — | 0.15 | 0.25 |
| $Fe_2O_3$ | — | — | 0.05 | — | — | 0.15 |
| $V_2O_5$ | — | 0.05 | — | — | 0.10 | — |
| Co | 0.20 | 0.30 | — | — | 0.75 | — |
| CoO | 0.60 | — | 0.10 | 0.20 | — | 1.50 |
| Ni | — | — | — | — | 2.55 | — |
| NiO | — | — | — | — | — | 4.35 |

TABLE 3-continued

| | Examples of Compositions (% by weight) | | | | |
|---|---|---|---|---|---|
| | Group I | | Group II | | Group III |
| | 1 | 2 | 3 | 4 | 5 | 6 |
| Totals | 100.0 | 100.0 | 100.0 | 100.0 | 100.0 | 100.0 |

Finally, FIG. 8 shows a comparison of the transmission curves of a conventional glass (BG 3) with the glass of Example 1, in each case, before and after exposure. In the glass of Example 1, the transmission curves of the glass before and after the exposure are identical, i.e., the exposure does not cause any loss in transmission.

With respect to the test conditions for the exposure, once again those of the aforesaid test procedure were selected.

EXEMPLARY EMBODIMENT

The invention will now be further described with reference being made to an exemplary embodiment thereof. It should, however, be recognized that the following example is not intended as a definition of the scope or limitations of the present invention.

As illustrative of the present invention, for producing 100 kg of $Co^{2+}$ colored alkali silicate glass having the composition of Example 1, the following ingredients are mixed into a uniform mass of raw material in a mixing drum:

64.064 kg of Sipur ($SiO_2$) "Sipur" is a trademark for silicon dioxide of the Bremthaler Quarzitwerke, Usingen, Federal Republic of Germany.
15.367 kg of boric acid ($H_3BO_3$)
23.181 kg of sodium hydrogen carbonate ($NaHCO_3$)
12.205 kg of potassium carbonate ($K_2CO_3$)
2.480 kg of barium carbonate ($BaCO_3$)
1.101 kg of zinc oxide (ZnO)
5.067 kg of lead oxide red ($Pb_3O_4$)
1.200 kg of stannic oxide ($SnO_2$)
0.253 kg of arsenic oxide ($As_2O_3$)
0.150 kg of ammonium chloride ($NH_4Cl$)
0.230 kg of sodium sulfate ($Na_2SO_4$)
0.200 kg of cobalt metal powder (Co)
0.844 kg of cobalt oxide ($Co_2O_3$)

This mixture is melted down in batches over a period of 6 to 7 hours at 1280 to 1320 degrees C. in ceramic or platinum fusing equipment. The degassing of the fused mass takes place in the temperature range of from 1470 to 1500 degrees C. over a period of from 2 to 4 hours.

The homogenization of the fused mass is performed at 1250 to 1480 degrees C. The time required for this is approximately 2 to 3 hours. The resulting fused glass is then poured into a pre-heated mold.

While only several embodiments of the present invention have been shown and described, it will be obvious to those skilled in the art that many modification may be made thereunto without departing from the spirit and scope of the invention.

What is claimed is:

1. An alkali silicate solarization-stable ultraviolet glass, transmitting in the 280–500 nm range, for use as an optical filter glass, said alkali silicate glass being colored with a member selected from the group consisting of $Co^{2+}$ and ($Co^{2+}$ and $Ni^{2+}$), consisting essentially of:

| | |
|---|---|
| $SiO_2$ | 52–71% by weight |
| PbO | 2.9–16.8% by weight |
| $SnO_2$ | 0.1–1.65% by weight |
| $Na_2O$ | 6.7–16.7% by weight |
| $K_2O$ | 0.5–9.9% by weight |
| $Na_2O + K_2O$ | 13.3–18.3% by weight |
| NiO + CoO | 0.1–4.4% by weight |
| $As_2O_3 + Sb_2O_3$ | 0.05–0.5% by weight |
| RO | 0–8.6% by weight |
| $B_2O_3$ | 0–8.5% by weight |
| $Al_2O_3$ | 0–0.55% by weight |
| ZnO | 0–10.5% by weight | wherein,
R is an element selected from the group consisting of Mg, Ca, Sr, Ba and a combination thereof.

* * * * *